A. M. DUDLEY.
SYSTEM OF SPEED CONTROL FOR INDUCTION MOTORS.
APPLICATION FILED OCT. 21, 1916.

1,296,487.  Patented Mar. 4, 1919.

WITNESSES:
Fred. A. Lind.
D. C. Davis

INVENTOR
Adolphus M. Dudley
BY
Wesley G. Carr
ATTORNEY

UNITED STATES PATENT OFFICE.

ADOLPHUS M. DUDLEY, OF OAKMONT, PENNSYLVANIA, ASSIGNOR TO WESTINGHOUSE ELECTRIC & MANUFACTURING COMPANY, A CORPORATION OF PENNSYLVANIA.

SYSTEM OF SPEED CONTROL FOR INDUCTION-MOTORS.

1,296,487.

Specification of Letters Patent. Patented Mar. 4, 1919.

Application filed October 21, 1916. Serial No. 126,891.

*To all whom it may concern:*

Be it known that I, ADOLPHUS M. DUDLEY, a citizen of the United States, and a resident of Oakmont, in the county of Allegheny and State of Pennsylvania, have invented a new and useful Improvement in Systems of Speed Control for Induction-Motors, of which the following is a specification.

My invention relates to systems of speed control for induction motors and like apparatus, and it has for its object to provide a system of the character designated whereby the motor may be accelerated in a smooth, uniform and economical manner, up to, through, and above synchronism.

Figure 1:
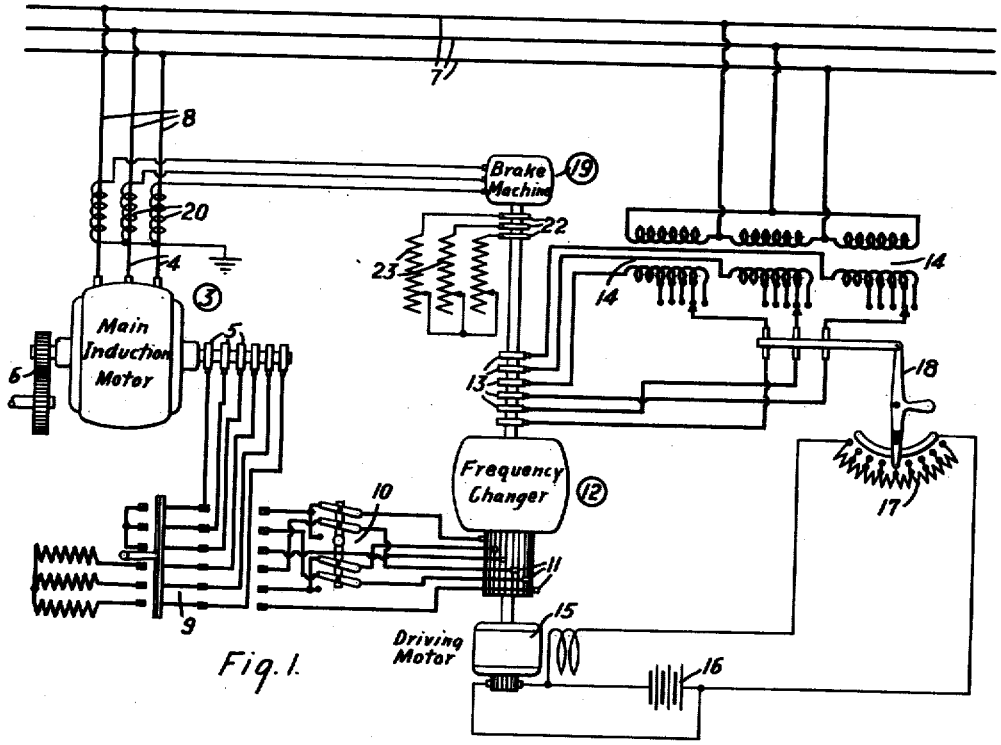
Figure 2:
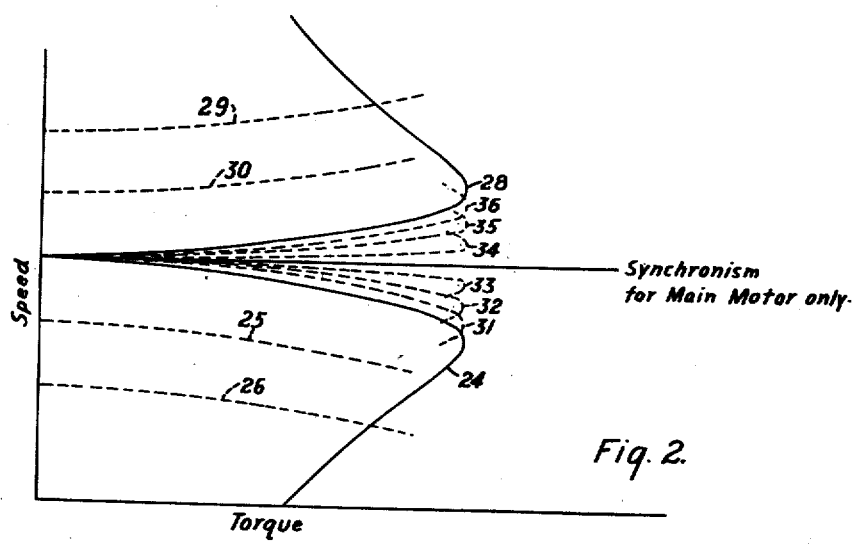

In the accompanying drawing, Figure 1 is a diagrammatic view of an induction motor, together with attendant supply and control circuits and auxiliary apparatus, embodying a preferred form of my invention; and Fig. 2 is a diagram illustrative of the operation of the system shown in Fig. 1.

In a copending application of Wilfred Sykes, Serial No. 127,386, filed Oct. 24, 1916, and assigned to the Westinghouse Electric & Manufacturing Company, is described and claimed a system for the speed control of an induction motor whereby the primary member of the induction motor is connected directly to a source of alternating current and whereby the secondary winding of said motor is connected to said source through a frequency-changer, the speed of which may be independently varied. An additional feature of the aforementioned application is that an electrical braking machine is applied to the frequency-converter shaft and serves to slightly lower the speed of the frequency-changer, with an increase in the main motor load during under-synchronous operation and, furthermore, serves to slightly increase the speed of the frequency-changer with an increase in the main motor load through over-synchronous speed, thus insuring stability of operation.

The frequency-changer employed in the aforementioned system is preferably of the type described and claimed in U. S. Patent No. 682,943, issued to the Westinghouse Electric & Manufacturing Company on an application filed by B. G. Lamme. Said frequency-changer is, in its essential features, similar to the ordinary rotary converter except that the stator thereof need not be provided with a winding and with the additional change that the brush sets accord with the phases of the output current, both in number and in position. If a frequency-changer of this character is supplied with alternating current through its slip rings to produce a rotating field in the armature in either direction and is then caused to revolve at like speed in the opposite direction, direct current may be derived from the brushes. If the rotor be caused to depart from synchronous speed, alternating current may be derived from the brushes at a frequency which is proportional to the divergence from synchronous speed. The direction of phase rotation of the resultant alternating currents for under-synchronous operation is opposite to that for over-synchronous operation.

In the aforementioned application of Wilfred Sykes, during the initial acceleration of the main induction motor, the frequency-changer is driven far below synchronous speed, thus producing a relatively high output frequency for application to the secondary winding of the induction motor to produce the desired slip thereof. The main induction motor is then caused to build up in speed by increasing the speed of the frequency changer until, at synchronous operation of the main induction motor, the frequency changer is running at synchronous speed, as determined by the rotating field established by the energy input thereto. For operation of the main induction motor above synchronous speed, the frequency changer also is operated above synchronous speed, thereby producing the desired reversal in the direction of phase rotation of the energy interchange between the two machines as demanded by over-synchronous operation of the main motor and to cause energy to flow from the line to the secondary member of the main induction motor, rather than in the reverse direction, as is the case during under-synchronous operation.

By the present invention, I bring the main induction motor up to speed in the manner above indicated but, upon attaining synchronism, I reverse the direction of phase rotation in the leads connecting the secondary winding of the main induction motor to the source, by suitable switching means, and, for subsequent over-synchronous acceleration of the main induction motor, I reduce the frequency-changer speed. In this manner, I am able to pass through synchronism in a smooth and certain manner and I am further able to secure over-synchronous operation with a frequency-changer operating at relatively low speeds so that the commutation thereof is satisfactory and so that the driving motor therefor need have but small speed range.

Referring to the accompanying drawing for a more detailed understanding of my invention, I show a main induction motor at 3 in Fig. 1, said induction motor being provided with primary terminals 4—4 and with secondary terminals 5—5 in the form of the usual slip rings. The motor 3 is mechanically coupled to drive any suitable load, such, for example, as a rolling mill, through suitable gearing 6. Energy for the operation of the motor 3 is derived from any suitable source, such, for example, as a polyphase supply line 7 through leads 8—8. Energy derived from the secondary terminals 5 is supplied through a starting switch 9 and a phase-rotation reversing switch 10 to the brushes 11 of a frequency-changer 12 provided with slip rings 13. The slip rings 13, in turn, are connected to the supply system 7 through transformers 14—14 having an adjustable voltage. The frequency-changer 12 is driven by any means, such, for example, as a direct-current motor 15 operated from a direct-current source 16. The field excitation of the motor 15 is subjected to the control of a rheostat 17 which is mechanically coupled to the adjusting means for the transformers 14—14 by any suitable means, such, for example, as a linkage 18.

A brake device 19, in the form of an induction dynamo-electric machine, is mechanically coupled to the shaft of the frequency-changer 12 and has its primary winding connected to be energized from current transformers 20—20 operatively associated with the main supply leads 8. The secondary winding of the brake machine 19 is connected to suitable slip rings 22 which, in turn, are interconnected through an adjustable resistor 23.

Having thus described the arrangement of a system embodying my invention, the operation is as follows: At the start, the switch 9 is thrown to the left, short-circuiting the secondary winding of the main motor 3 and producing an appreciable speed therein. At the same time, the linkage 18 is adjusted so that there is a low ratio of transformation in the transformers 14 and so that a small portion of the resistance of the resistor 17 is cut in, producing a strong field excitation and low speed in the driving motor 15. The starting switch 9 is thereupon thrown to the right, and the relatively high-voltage, high-frequency energy of the secondary winding of the main motor 3, produced by marked under-synchronous operation, is suitably converted in frequency in the machine 12 and in voltage in the transformers 14 for return to the mains 7.

For the acceleration of the motor 3, the linkage 18 is gradually adjusted to increase the speed of the driving motor 15 and to increase the ratio of the transformers 14, reducing the slip frequency of the main induction motor 3 for the acceleration thereof, at the same time permitting the return of the secondary energy to the line.

The speed-torque curve of the main induction motor 3, if the frequency changer 12 were permitted to come up to synchronous speed, would assume a substantially horizontal line over its working portion if it were not for the action of the brake machine 17. It has been found, however, as explained in a copending application of B. G. Lamme, Serial No. 583, filed Jan. 5, 1915, and assigned to the Westinghouse Electric & Manufacturing Company, that, for stable operation, it is desirable that the speed of the frequency changer decrease, with an increase in the main motor load, by substantially the same amount that the main motor would decrease in speed under like conditions because of resistance slip.

This result is attained by causing the torque of the induction machine 19 to oppose the torque of the driving motor 13, and the brake effect thus produced is proportional to the load current of the main induction motor because of the method of primary energization employed in the machine 19. As a result, the speed-torque curve, for substantially synchronous operation of the frequency changer 12, assumes some such shape as is indicated at 24 in Fig. 2. If running speeds below synchronism are desired, the speed of the frequency-changer 12 is regulated accordingly and the brake machine 19 produces a similar drooping effect with varying loads. Speed-torque curves, as shown at 25—26, are produced, the operating portions of said torque curves being similar in shape to the operating portion of the curve 24 but having their ordinates decreased with respect to the ordinates thereof, in accordance with the percentage speed reduction.

For stable over-synchronous operation of the main induction motor, a speed-torque curve having a shape similar to that shown at 28 in Fig. 2 must be employed, the speed of the main induction motor increasing with a load increase. To produce operation of this character, it is necessary that, as the load comes on the main motor, the frequency changer shall supply an increasing frequency to the main motor secondary. In the copending Sykes patent referred to, this is accomplished by reversing the torque of the brake machine. In my system, this is accomplished by reversing the leads between the frequency changer and the main motor secondary. This change permits the main motor to depart from synchronism in the upward direction while the frequency changer departs from synchronism in the downward direction. This also means that, while the brake machine exerts a torque at all times tending to lower the speed of the frequency changer as the load comes on the main motor, this action will result in an increasing frequency being supplied to the main motor as the load comes on when it is operating above synchronism. This gives to the main motor, when operating above synchronism, a rising speed characteristic with increase of load, as is necessary for stable operation. In passing through synchronism, a voltage for circulating direct current through the rotor of the main induction motor is produced in the frequency-changer, thus maintaining the torque, as a synchronous motor, at that instant.

The change in the shape of the speed-torque characteristics of the main motor, as it approaches and passes through synchronism, is shown by curves 31—32—33—34—35—36, etc. While the main motor is operating at synchronous speed and is excited by direct current from the frequency changer, the switch 10 is operated to reverse the direction of phase rotation between the main motor and the frequency changer, thus preparing the main motor for over-synchronous operation, as already stated.

For subsequent acceleration in the over-synchronous range, the frequency-changer is reduced in speed by the same percentage below synchronism that is desired to operate the main motor above synchronism.

The electromotive force of the secondary member of the main induction motor is a maximum at standstill, falling to zero at synchronism and rising again to a maximum as double synchronous speed is approached. This necessitates a minimum ratio of transformation in the transformers 14 at standstill, rising to a maximum ratio at synchronous speed and falling again to a minimum as double synchronous speed is approached. By operating the driving motor 15 at a minimum speed at standstill of the main motor, increasing the speed of said driving motor to a maximum at substantially synchronism in the main motor, and thereafter again reducing the speed of said driving motor to a minimum value as twice synchronous speed in the main induction motor is approached, it will be noted that the coupling 18 is, at all times, operative to produce the desired simultaneous adjustment of the frequency-changer speed and of the transformer ratio.

In explanation of the action of the system above described during the transition to over-synchronous operation, attention is directed to the following characteristics of the apparatus employed.

In an induction motor operating in conjunction with a frequency-changer at under-synchronous speed, the rotating field set up in the secondary member rotates in the same direction as the primary rotating field but at slower speed. As the motor approaches synchronism, the absolute velocity of said secondary rotating field diminishes, becomes zero at synchronism and, for increasing over-synchronous speed, increases but in a direction opposite to the direction of rotation of the primary rotating field.

In like manner, in a frequency changer of the character designated, the phase rotation of the polyphase output is a maximum at very low speed, decreases to zero at synchronism and thereafter increases, in the opposite direction, to a similar maximum at double synchronous speed.

By associating an induction motor and a frequency changer, therefore, in a fixed manner throughout the entire speed range from zero to twice synchronism, it is seen that the reversal of phase rotation demanded by the motor at synchronism is furnished by reversing the phase connections between the motor and the frequency while operating at synchronism.

I, at no time, operate my frequency-changer in excess of synchronous speed, availing myself at all times of the frequency change obtainable between zero and synchronous speeds of the frequency changer for the speed control of the main motor and causing the polyphase currents produced over this speed variation to have the proper phase rotation by the operation of the switch 10.

In the system disclosed in the aforementioned Sykes application, it is necessary to have the brake machine 19 reverse in function and produce a negative-braking or motor effect when passing to over-synchronous operation, in order to speed up the frequency changer with a load increase of the main motor, as indicated by the rising curves 29—29—30.

In the system herein disclosed, however, the machine 19, at all times, functions as a brake, the fact that a decrease in the speed of the frequency changer increases the frequency supplied to the motor permitting the application of positive braking to the frequency changer to cause an increase in the speed of the main motor. This operating feature is of extreme importance in connection with systems of this character, as it permits the use of a wide variety of braking means on the frequency-changer shaft, such, for example, as an electrically operated mechanical brake, as shown in the aforementioned Lamme application, at the same time, permitting stable over-synchronous operation of the main motor.

For still higher operating speed, the frequency changer 12 is adjusted to run at the desired percentage under synchronous speed and produces speed-torque currents of the main induction motor having the form indicated at 29 and 30.

When lowering the speed of a motor through synchronism, according to the present system, the process of rising through synchronism is reversed, that is to say, at synchronism, the phase rotation between main motor and frequency changer is reversed by operating the switch 10 and then reducing the speed of the frequency changer slightly transferring the operation successively to points on curves such as 35—33—31, etc.

The phase-reversing switch has been shown between the frequency changer and the motor but, obviously, it may equally well be located at any other point in the leads connecting the secondary member of the induction motor to the alternating-current supply with like results.

While I have shown my invention as applied to the system specifically set forth in the aforementioned Sykes application, it is obvious that it is capable of wide application in connection with various systems of induction-motor control by the aid of frequency changers.

I have shown my invention in its preferred forms, but it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. In an induction-motor-control system wherein a frequency-changer is associated with the secondary winding of the induction motor for the speed control thereof, the combination with means for exerting a braking action on said frequency changer with a load increase of the main motor, of a phase-rotation reversing switch electrically associated with said frequency-changer, whereby, if said switch be reversed when the main induction motor passes through synchronism, subsequent acceleration of the main motor may be obtained by decreasing the speed of said frequency-changer, and said braking means may be effective in increasing the stability of operation of the main motor.

2. The combination with a source of alternating current, of an induction motor having primary and secondary windings, connections from said source to the primary winding of said motor, a frequency-changer, connections from said source through said frequency-changer to the secondary winding of said motor, means whereby said frequency-changer may be operated at synchronous speed for synchronous operation of said motor and decreased in speed to adjust the speed of said motor down to zero or up to double-synchronism, braking means for said frequency-changer and means for rendering the braking effect of said braking means substantially proportional to the load current of said main motor.

3. The combination with a source of alternating current, of an induction motor having primary and secondary windings, connections from said source to the primary winding of said motor, a frequency-changer, connections from said source through said frequency-changer to the secondary winding of said motor, means whereby said frequency-changer may be operated at synchronous speed for synchronous operation of said motor and decreased in speed to adjust the speed of said motor down to zero or up to double-synchronism, an auxiliary motor coupled to said frequency-changer, and means for energizing said auxiliary motor in accordance with the load current of said main motor, said auxiliary motor being driven against its torque in accordance with the speed of said frequency-changer.

4. The combination with a source of alternating current, of an induction motor having primary and secondary windings, connections from said source to the primary winding of said motor, a frequency-changer, connections from said source through said frequency-changer to the secondary winding of said motor, means whereby said frequency-changer may be operated at synchronous speed for synchronous operation of said motor and decreased in speed to adjust the speed of said motor down to zero or up to double-synchronism, an auxiliary motor of the induction type coupled to said frequency-changer, a current transformer associated with the supply leads of said main motor and connected to energize said auxiliary motor in accordance with the load current of said main motor, said auxiliary motor being driven against its torque in accordance with the speed of said frequency-changer.

In testimony whereof, I have hereunto subscribed my name this 16th day of Oct., 1916.

ADOLPHUS M. DUDLEY.